(12) United States Patent
Piaggio et al.

(10) Patent No.: US 10,404,860 B2
(45) Date of Patent: *Sep. 3, 2019

(54) CUSTOMER JOURNEY MANAGEMENT

(71) Applicant: Nice Ltd., Ra'anana (IL)

(72) Inventors: Natalia Beatriz Piaggio, London (GB); Leonard Michael Newnham, Calvert (GB)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,288

(22) Filed: Mar. 14, 2019

(65) Prior Publication Data

US 2019/0208060 A1 Jul. 4, 2019

Related U.S. Application Data

(63) Continuation of application No. 16/193,368, filed on Nov. 16, 2018, now Pat. No. 10,270,912, which is a continuation of application No. 15/986,983, filed on May 23, 2018, now Pat. No. 10,142,475, which is a continuation of application No. 15/612,151, filed on Jun. 2, 2017, now Pat. No. 9,986,094, which is a continuation of application No. 14/868,790, filed on Sep. 29, 2015, now Pat. No. 9,674,362.

(51) Int. Cl.
H04M 3/00 (2006.01)
H04M 3/51 (2006.01)
G06Q 30/02 (2012.01)

(52) U.S. Cl.
CPC ...... *H04M 3/5191* (2013.01); *G06Q 30/0201* (2013.01); *H04M 3/5141* (2013.01)

(58) Field of Classification Search
CPC .................. H04M 3/5191; G06O 30/0201

USPC ....... 379/265.01–265.14, 266.01–266.1, 309
See application file for complete search history.

(56) References Cited

U.S. PATENT DOCUMENTS

| | | |
|---|---|---|
| 7,107,535 B2 | 9/2006 | Cohen et al. |
| 7,152,106 B2 | 12/2006 | Cohen et al. |
| 7,305,622 B2 | 12/2007 | Cohen et al. |
| 7,644,134 B2 | 1/2010 | Cohen et al. |

(Continued)

OTHER PUBLICATIONS

"Powering LEAN with Big Data, Powered by ClickFox, McKinsey Solutions", Nov. 2014, pp. 1-1.

(Continued)

*Primary Examiner* — William J Deane, Jr.
(74) *Attorney, Agent, or Firm* — Pearl Cohen Zedek Latzer Baratz LLP

(57) ABSTRACT

Systems and methods of managing customer journeys are implemented using one or more processors in a computing system. Each journey may comprise a succession of interactions at interaction points such as telephone conversations, responses to an interactive voice response "IVR" system and viewing a web page. Customer journey scores are determined for customers at one or more interaction points along the customer journey and the customer journey score is used to determine whether and when an intervention should take place. Models for determining customer journey scores may be created for a set of customers based on one or both of subjective and objective data relating to a subset of the set of customers that have made some or part of the journey, e.g. customers that have responded to polls. An intervention may take place during the journey or after completion of the journey.

27 Claims, 8 Drawing Sheets

(56) References Cited

U.S. PATENT DOCUMENTS

| | | | |
|---|---|---|---|
| 7,673,340 | B1 | 3/2010 | Cohen et al. |
| 7,725,840 | B2 | 5/2010 | Cohen et al. |
| 8,565,411 | B2 | 10/2013 | Kannan et al. |
| 8,769,441 | B2 | 7/2014 | Cohen et al. |
| 9,092,801 | B2 | 7/2015 | Chang et al. |
| 9,115,763 | B2 | 8/2015 | Hagan |
| 9,123,055 | B2 | 9/2015 | Evans et al. |
| 9,413,891 | B2 | 8/2016 | Dwyer et al. |
| 2010/0318400 | A1 | 12/2010 | Geffen et al. |
| 2012/0130817 | A1 | 5/2012 | Bousaleh et al. |
| 2013/0124257 | A1 | 5/2013 | Schubert |
| 2013/0218947 | A1 | 8/2013 | Zur et al. |
| 2014/0143017 | A1 | 5/2014 | Kannan et al. |
| 2014/0219437 | A1 | 8/2014 | Kannan et al. |
| 2015/0170056 | A1 | 6/2015 | Breckenridge et al. |
| 2015/0195406 | A1 | 7/2015 | Dwyer et al. |
| 2015/0237206 | A1 | 8/2015 | Sri et al. |
| 2015/0296026 | A1 | 10/2015 | Smyth et al. |
| 2015/0310445 | A1 | 10/2015 | Chan et al. |
| 2015/0310464 | A1 | 10/2015 | Evans et al. |
| 2015/0350435 | A1 | 12/2015 | Connolly et al. |
| 2016/0042419 | A1 | 2/2016 | Singh |
| 2016/0071126 | A1 | 3/2016 | Chang et al. |
| 2016/0078456 | A1 | 3/2016 | Chakraborty et al. |
| 2016/0104177 | A1 | 4/2016 | Bridwell et al. |
| 2016/0352900 | A1 | 12/2016 | Bell et al. |
| 2017/0064083 | A1 | 3/2017 | Gilbert |

OTHER PUBLICATIONS

"Customer Experience Analytics Solutions, Powered by ClickFox", McKinsey Solutions, Nyenrode, Jun. 5, 2014, pp, 1-25.
"Customer Journey Analytics and Big Data, McKinsey on Marketing & Sales—Slideshare Brief", Mc Kinsey & Company, Apr. 2013, pp. 1-16.
"Big Data and Advanced Analytics 16 Use Cases From a Practitioner's Perspective", Workshop at Nasscord Conference—by Invitation, McKinsey & Company, Jun. 27, 2013, pp. 1-29.
"The Whole Picture: Gaining a True Understanding of the Customer Experience", CITO Research, Clickfox, May 2012, pp. 1-11, URL: https://wh itepapers. em 360tech. com/wpcontent/files_mf/1361199380cfwhitepaperthewholepicturecito.pdf.
"Product, Customer Journey Analytics Platform", Clickfox, 2016, obtained on May 12, 2017, from URL: https://www.clickfox.com/product, pp. 1-9.
"Clickfox Experience Analytics Platform" Clickfox, Nov. 9, 2015, pp. 1-4.
"Greenplum Data Computing Appliance reduces data latency, puts data to work faster, and drives competitive advantage" EMC Website, 2011, obtained on Nov. 9, 2015, pp. 1-3.
"Customer Success Telecommunications, Case Study", Clickfox, Jun. 7, 2017, pp. 1-2.
"Big Data Analytics, Digital Transformation in Telecommunications & Beyond, Interview with Jerry Adriano", Clickfox, Oct. 1, 2014, pp. 1-7.
"Know, understand & drive the ideal customer experience", Clickfox, 2011, pp. 1-3.
"Customer Success Banking, Case Study", Clickfox, obtained Jun. 7, 2017, pp. 1-2.
"Market Brief, Voice Self-Service Trends and Best Practices", CEAI, Clickfox, 2009, obtained on Jun. 7, 2017, pp. 1-4.
"The Customer-Centric Enterprise", Clickfox, obtained Jun. 7, 2017, pp. 1-7.
"IVR Optimization Best Practices", Clickfox, A Technical White Paper, No. 2.2, Oct. 2008, pp. 1-10.
"ClickFox Customer Experience Analytics", Clickfox, A Technical White Paper, No. 2.2, Oct. 2008, pp. 1-6.
"ClickFox Enables Richer Data Analysis", Clickfox, Sep. 20, 2012, pp. 1-7, URL:http://www.clickfox.com/clickfox-enables-richer-data-analysis.

"ClickFox, Inc Connects the Retail Point of Sale Experiences to the Contact Center", ThomasNet Industry News, Aug. 20, 2007, pp. 1-6, URL: http://news.thomasnet.com/companystory/clickfoxincconnectstheretailpointofsaleexperiencestothecontactcenter528439.
"ClickFox Announces Three Customer Experience Analytics (CEA) Business Solutions", MarketWatch, May 5, 2009, pp. 1-2, URL: http://www.veritasvc.com/news/iFiles/ClickFox_2009-05-05.pdf.
"Clickfox Accelerating Performance and Scalability to Drive Competitive Advantage", Pivotal, 2014, pp. 1-2.
Bagley, "Improving Predictions with Journeys", Clickfox, Mar. 24, 2016, pp. 1-6. URL: https://bl og.cl ickfox.com/bl og/improvi ngpredicti onsjou rneys/6/.
Holloway, "Journey Dataset Explained—Journey Dataset Series I Part 3", Clickfox, Apr. 5, 2016, pp. 1-5, URL: https://blog.clickfox.com/blog/journey-dataset-explained-part3/.
"The ClickFox Journey Architecture", Clickfox, Journey Architecture, Whitepaper, Obtained Feb. 27, 2017, oo. 1-7.
"Unlock the Power of Journeys Discover the hidden stories in Your data", Clickfox, obtained May 12, 2017, pp. 1-6.
McKinsey & Company, "Bid Data and Advanced Analytics 16 Use Cases From a Practitioner's Prespective", Nasscom Conference, Jun. 27, 2013, pp. 1-30.
Wachem "Every Bank Has a Story: 10 Opportunities That Hide in Your Data", Clickfox, Sep. 21, 2016, pp. 1-6. URL: https://blog.cl ickfox.com/everybankhasastorytotell 1 Oopportunitiesi nyourdata.
Holloway, "Bringing the power of journey data to agents—Journey Dataset Series I Part1", Clickfox, Oct. 25, 2016, pp. 1-5. URL: https://blog.clickfox.com/blog/bringinaoowerofjourneydata/.
Heath "Behavioral Drivers to Outcomes—Journey Dataset Series Part 2", Clickfox, Feb. 26, 2016, pp. 1-4. URL: https://blog.clickfox.com/blog/journeydatasetseriespart2/.
Linask, "ClickFox Takes Customer Experience Analytics Beyond the Contact Center", TMC NET, Apr. 3, 2008, pp. 1-2.
"The Leader in Journey Analytics", Clickfox, obtained May 12, 2017, pp. 1-5. URL: https://www.clickfox.com/expertopinions.
Raab, "ClickFox's new spin on funnel analysis", Apr. 19, 2007, pp. 1-2, URL: http://www.dmnews.com/clickfoxsnewspinonfunnelanalysis/printarticle/95266/.
"Utilities Optimize journeys for customer satisfaction, while reducing costs", Clickfox, obtained May 12, 2017, pp. 1-5, URL: https://landing.clickfox.com/utility/utilitycustomerexperience.
"Create Index", Pivotal, pp. 1-8, Nov. 9, 2015, URL: http://gpdb.docs.pivotal.io/4320/ref_guide/sql_commands/CREATE_IN DEX.html.
"Customer Success Stories Utility", Clickfox, Obtained Feb. 27, 2017, pp. 1-6.
"Clickfox Journey Insights", Clickfox, Obtained Feb. 27, 2017, pp. 1-5.
Gossman et al. "ClickFoxCase Study Influencer Engagement and Market Research" Mblast Clickfox, Feb. 13, 2014, pp. 1-17.
"From Data Chaos to Data Order", Clickfox, Obtained Apr. 7, 2015, pp. 1-3.
Bagley, "Can Customer Retention be Automated by Machine Learning?", Clickfox, Feb. 13, 2017, pp. 1-7. URL: https://blog.clickfox.com/cancustomerjourneyretentionbeautomatedbymachinelearnina.
Bagley, "Can Machine Learning Impact the Customer Journey? Yes, if You Help it.", Clickfox, Feb. 2, 2017, pp. 1-6. URL: https://bloa.clickfox.com/machinecanimpactthecustomeriournevifyouhelpit.
"Leading Provider of Digital Entertainment Turns to ClickFox to Map Customer Journeys, Ingesting Millions of Customer Interactions Into Customer Experience Analytics Platform" MarketWired, Oct. 11, 2012, pp. 1-2. URL: http://www.marketwired.com/printerfriendy?id=1712302.
"McKinsey Solutions ClickFox Client Service Manager New York", McKinsey & Company, Obtained May 1, 2015, pp. 1-3 URL: https://mckinsey.secure.force.com/EP/job details?jid=a0xAOOOOOOCy3UVIAZ.
"Innovation Through Big Data Insights", Clickfox, Jun. 8, 2017, pp. 1-8 URL: http://www.clickfox.com/innovation-through-big-data-insights-utilities.

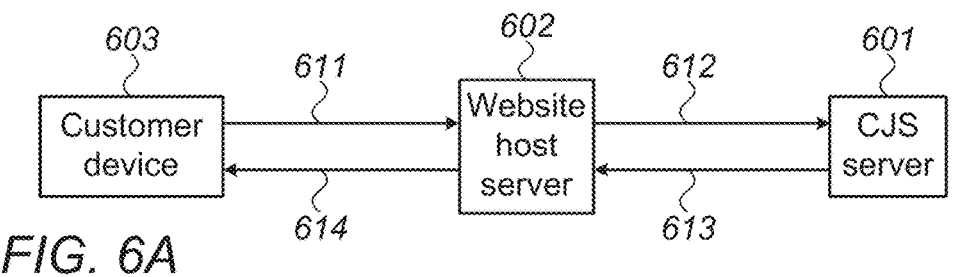
FIG. 6A
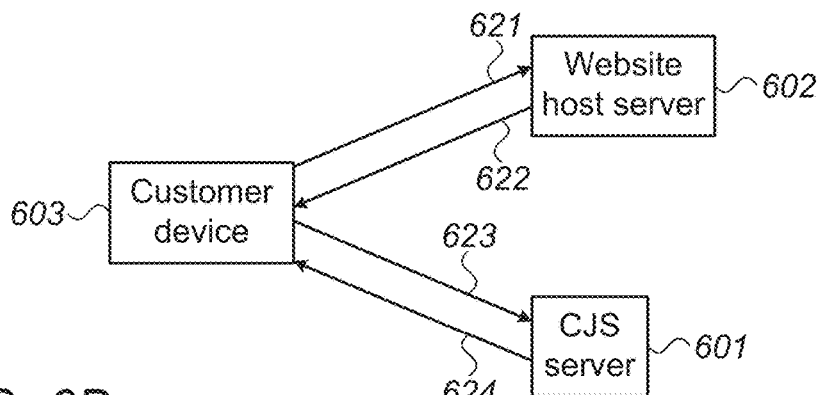
FIG. 6B
FIG. 7
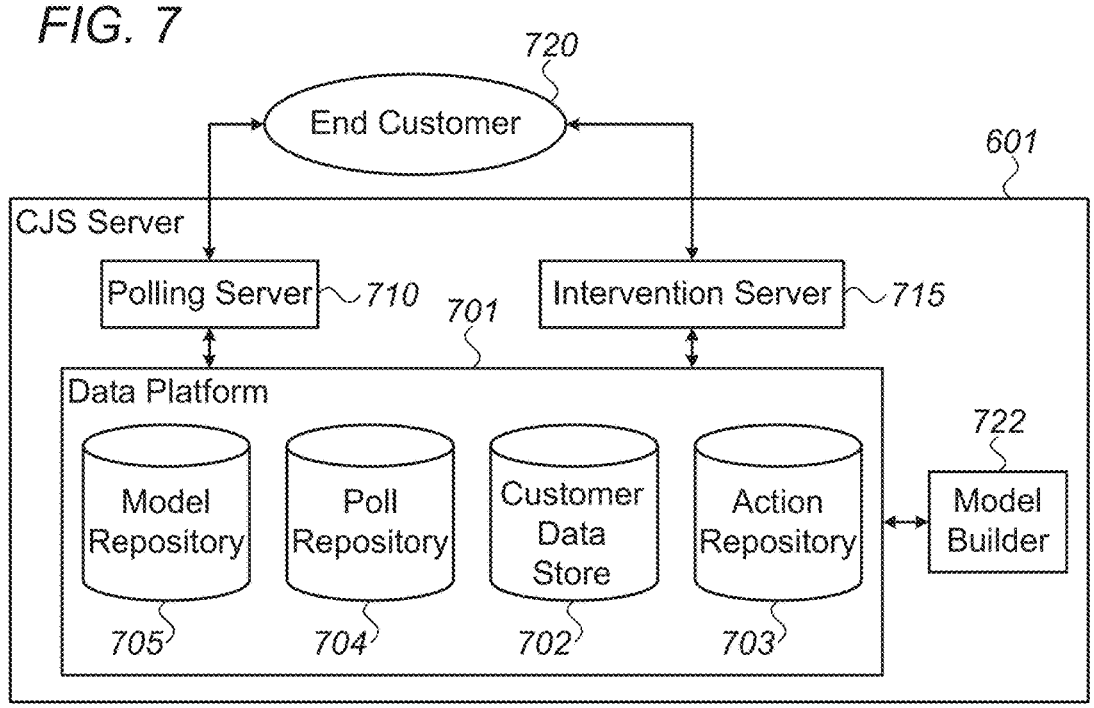

CUSTOMER JOURNEY MANAGEMENT

CROSS-REFERENCE TO RELATED APPLICATIONS

This application is a continuation of U.S. patent application Ser. No. 16/193,368 filed Nov. 16, 2018, which in turn is a continuation of U.S. patent application Ser. No. 15/986,983, filed May 23, 2018 which issued as U.S. patent Ser. No. 10,142,475 on Nov. 27, 2018, which in turn is a continuation of U.S. patent application Ser. No. 15/612,151, filed Jun. 2, 2017, which issued as U.S. Pat. No. 9,986,094 on May 29, 2018, which in turn is a continuation of U.S. patent application Ser. No. 14/868,790, filed Sep. 29, 2015, which issued as U.S. Pat. No. 9,674,362 on Jun. 6, 2017, all of which are incorporated herein by reference in their entirety.

FIELD OF THE INVENTION

The present invention is in the field of managing customer journeys, for example managing a series of interactions between a customer and another party, for example a company, in order to improve the efficiency and quality of the interactions, or the series of interactions which is known as a "journey".

BACKGROUND OF THE INVENTION

Customer journey management may involve customer journey mapping. Customer journey mapping can include the process of assembling all interactions a customer has with a company or other third party into one time-line. Examples of interactions include but are not limited to, each page view on a company website, telephone conversations and responses to an interactive voice response "IVR" system. A customer journey may be represented in a computing system as a set of logged events, and each event may correspond to an interaction.

Customers may interact with companies over one or more channels such as telephone, email, web browsing and others. Consequently, customer journeys may span one or more channels.

Customers may be identified by different identifiers at different times, according to the channel they are using (e.g. by a telephone number in a call center channel or an anonymous cookie in a web channel). Complete customer journeys may be built up by joining up data across many channels. Once this is done, various analyses are possible that frequently fall under the broad label of customer journey mapping.

Today companies can embark on customer journey mapping as they typically believe that information derived from this exercise can help their businesses in various ways such as:
Fixing and improving processes
Reducing customer effort and improving customer experience (CX)
Preventing customer defection and churn
Reducing the level of complaints
Increasing the level of up-selling and cross-selling opportunities
Differentiating their business based on customer experience However, there are typically difficulties centered on how the assembled customer journeys are used to achieve the above goals. To achieve any of these it is desirable to know, for example at one or more key stages during their journey, what the customer is trying to do and why. However, customer journey mapping may only provide a historical trail of where customers have been and what actions they have performed. If it can be inferred from this information what customers are trying to do and how successfully they are in doing it, it is possible to proactively intervene in the journey when necessary to improve the customer experience.

The use of information, such as that provided by customer journey mapping, to intervene in a customer journey or otherwise improve a customer journey for example by redesign of a web site or IVR system may be termed customer journey management.

Today, most companies take one of several approaches to the use of customer journey mapping information for customer journey management. Each of these gives a limited view of the customer's real intent. Examples of such approaches include:
   Only using "attitudinal" sometimes called "intent based" survey results—in this approach at some critical point in a customer journey (e.g. immediately after finishing a call center call) a survey question or questionnaire is sent to the customer, for example using a text message, asking what their experience was like or how completely they achieved their objective.
   The problem here is that surveys are usually sent to only a small subset of customers. If customers were asked questions after every interaction some would soon become frustrated and the effect would be to worsen the customer experience.
   Only using behavioral events—these may comprise raw interaction data, for example relating to page view events on the web, products purchased, call center logs, etc.
   This approach confines itself to the facts and makes no attempt to reveal customer attitude or intent directly. Human interpretation of patterns in the data is generally required to infer attitude and then again human intervention to make the required changes to address the above goals.
   Using heuristics based on business assumptions, for example "if a customer wants to do X then they will visit page A, then call the call center". The ease with which they perform a certain sequence of actions is assumed to correlate with customer satisfaction. A customer trying the same sequence several times may be assumed to be having trouble and possibly require assistance. The usefulness of this approach is limited by the accuracy of the heuristics and provides no information about how these heuristics are created in the first place. Furthermore, as these heuristics are typically likely to be things a human can easily remember and articulate they are likely to be relatively simple and address only a small number of ideal interaction paths. Real interaction paths are, generally, a lot more complex.

The results of efforts to drive proactive action using known approaches are frequently inaccurate and sometimes counterproductive. By using small sample sizes, not taking a joined up approach across the full customer journey, and not taking into account the impact that the sum of all customer interactions can have in the customer experience, most approaches are limited in the benefit they can deliver.

SUMMARY

Some embodiments of the invention provide systems and methods for managing customer journeys of the kind comprising a succession of interactions at interaction points between a customer and another party. According to some embodiments of the invention, a customer journey score may be determined for the customer at one or more interaction points along the customer journey and used to determine whether and when an intervention should take place. According to some embodiments of the invention, customer journey score may be based on a combination of subjective and objective data relating to the customers. According to some embodiments of the invention the customer journey score may be determined in real time using one or more processors in a computing system, for example as the customer progresses along the journey. Embodiments of the invention may be used to automate intervention in a manner that is not possible without the use of computing systems and may result in an improved experience for the customer and more efficient operation of the systems overall.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may be understood by reference to the following detailed description when read with the accompanied drawings. Embodiments of the invention are illustrated by way of example and not limitation in the figures of the accompanying drawings, in which like reference numerals indicate corresponding elements, and in which:

FIGS. 6A and 6B are schematic diagrams showing basic components of two alternative systems according to embodiments of the invention;

FIG. 7 shows an example high level architecture suitable for a CJS server as shown in either of FIG. 6A or 6B according to some embodiments of the invention;

DETAILED DESCRIPTION

Figure 1:
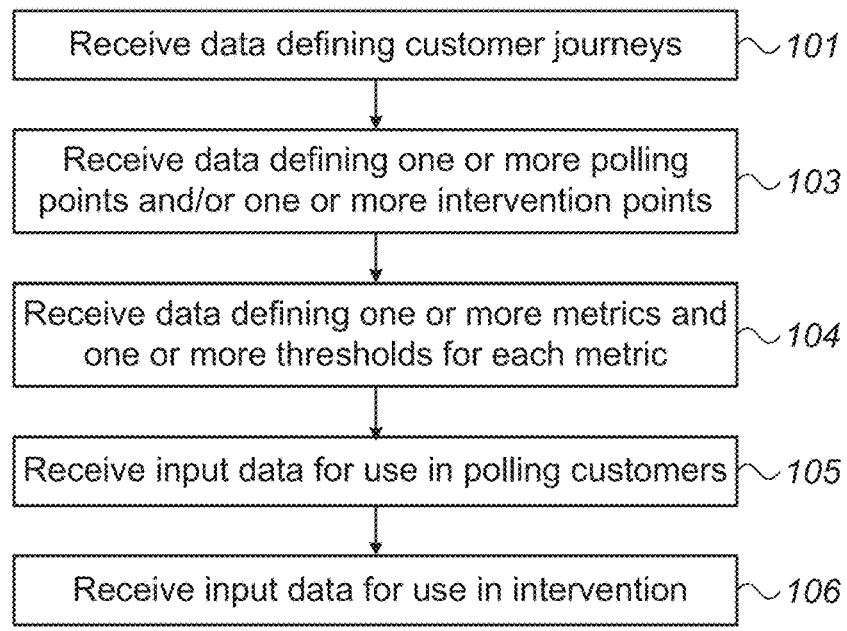
FIG. 1 is a flow chart showing operations that may be performed as part of the configuration of a system for the determination and application of customer journey scores according to embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The following are further definitions of terms used in this description and in the field to which the invention relates:

"Customer" is used herein to refer to any individual undergoing a journey comprising a series of interactions and is not limited to prospective purchasers of products or services. Furthermore the term "customer" is not limited to humans and could include machines and applications running on processors in computing systems.

"Company" is a typical example of a third party with whom a customer may interact along a customer journey, either directly such as in a telephone call or indirectly such as via a website hosted on behalf of a party. The third party may be any organization or individual. Embodiments of the invention are not limited to interactions between customers and companies.

The term "attitudinal" is used to refer to data collected from customers that is subjective, for example responses to polls in which one customer may give a different answer from another in exactly the same circumstances.

The term "behavioral" is used to refer to objective data relating to customer activities such as call volume, call duration, whether a customer made a purchase and other variables.

Objective data relating to customers may include other customer descriptive data including values for other variables such as age, income, place of residence etc.

Interactions include but are not limited to views of or other interactions at a web page such as clicking on a link or typing text in response to a question, or interactions using other channels such as telephone, e.g. responses to an IVR system, exchange of SMS messages and exchange of email messages.

Interaction points may be any points at which a customer interacts with another party, for example during a customer journey, such as but not limited to web pages and responses to particular questions in an IVR system.

The term "intervention" is used to refer to any activity by or on behalf of the party with whom the customer is interacting to influence the customer journey or improve the customer's experience. An intervention may be done in real time, for example a pop-up on a website; or later, for example following up with a voucher at the end of a journey.

The terms "survey" and "poll" are used interchangeably and are to be understood to have the same meaning herein unless otherwise stated.

Some embodiments of the invention provide systems and processes that use both attitudinal data, such as survey response data, and behavioral data, such as event data, to determine a score for a customer, also referred to herein as a "customer journey score". The score may be determined in real-time. A score may be determined for every customer or for a subset of customers interacting with a company. According to embodiments of the invention, a customer journey score may be determined for customers for whom there is no behavioral and/or attitudinal data, for example by extrapolation of behavioral and attitudinal data relating to other customers.

This score may estimate one of a family of metrics of interest. Examples of these metrics may include but are not limited to:

Customer effort, for example how hard it is for the customer to achieve their current task.

Customer satisfaction,

Propensity to register a complaint.

How likely to recommend to a friend

The customer journey score may be defined as a real-time prediction of a metric relating to the customer. According to embodiments of the invention, the customer journey score depends on the customer's location within the journey. For example, if the metric is satisfaction, the customer journey score may vary at points along the journey, for example depending on how many interactions have already occurred.

It is possible according to some embodiments of the invention for multiple scores to be determined for a customer, each score being an estimate of a different metric.

According to some embodiments of the invention, monitoring of one or more of the scores e.g. constantly or at certain points in a customer journey, may be used to prompt an intervention in the customer journey. An intervention may be prompted for example if the value of the score exceeds a predetermined threshold. For example, if a particular customer's customer effort score crosses some threshold indicating the customer is struggling to complete some task an intervention could be prompted. Another example could be if someone's level of dissatisfaction crosses a threshold where a complaint is likely then a money-off voucher could be automatically emailed to them that night. Different thresholds may be used for different metrics and different metrics may be scored in different ways. For example effort could be measured on a scale of 1-10 and dissatisfaction could be measured on a scale of 1-5, both of which could be either in integers or in more precise values. It is even possible for more than one threshold to be defined for a particular metric, for example there may be different thresholds for different groups of customers. The intervention could be automatic, for example on the web a pop-up providing targeted assistance.

Some embodiments of the invention provide a process that collects attitudinal data from a sample of customers and uses machine learning to build predictive models to infer satisfaction level or other metrics (such as customer effort) of any customer, not only those in the sample, and determine a score for the metric. According to some embodiments of the invention, a score may be determined anywhere in the customer journey. According to some embodiments an appropriate score may be determined at predetermined points in the journey. This real-time prediction is then used to automatically intervene in the customer journey, for example when some threshold is crossed.

Processes and systems for determining and using customer journey scores according to embodiments of the invention will now be described in general terms with reference to FIGS. 1-3. They may be implemented using algorithms operated by one or more processors in a computing system and it will be appreciated that the operations involved in the processes may be distributed across multiple processors in a variety of ways and not necessarily separated into the operations illustrated in FIGS. 1-3. The operations shown in FIG. 1 may be considered to include configuration operations. Some of the operations of FIG. 1 may be performed wholly or partially by a user operating a device such as a desktop computer. Some of the operations of FIG. 1 may be performed automatically, for example using one or more processors in a computing system. The operations shown in FIGS. 2 and 3 may be considered to include implementation operations. Systems and processes according to embodiments of the invention may include some or all of the operations shown in FIGS. 1-3. For example some operations including but not limited to the design of content for e.g. polling or intervening in a journey, may be performed elsewhere, e.g. by another party.

In the first operation 101 shown in FIG. 1, one or more customer journeys of interest may be defined, for example customer journeys to be managed such as one in which an intervention is desired, for example when predicted customer effort is high or satisfaction is low. Customer journeys may be defined in order to restrict interventions to customers who are likely to be doing something of interest, e.g. buying a product, rather than those who stumble on an intervention point randomly. Thus a computing system according to some embodiments of the invention may receive input defining, or for use in defining, a customer journey, and a customer journey is thereby predetermined.

Examples of journeys include but are not limited to: traveling through the sales funnel for a retailer (so-called because the number of customers generally decreases towards the conclusion of the sale), first bill payment e.g. for a telecom company, and the journey up to a complaint e.g. for a financial services organization. Each journey of interest may be defined by entry and exit criteria. This may be used so that at any point along the journey, customers in the journey of interest can be differentiated from those who are not.

To take the example of first bill pay, the entry criterion could be: customer has taken out a new account and billing date has passed but bill has not yet been paid. The exit criterion could be: bill paid. For complaint, the entry criterion could be quite wide: any active customer who has previously bought a product or service within a particular time frame and the exit criteria could be a timeout period e.g.

a period of no activity which could be the same as the time frame. In a sales funnel journey for an online retailer the presence of a customer in the journey could simply be defined as the customer having visited one of the sales funnel pages on the company website within the last 30 minutes.

At the next operation 103 in FIG. 1 one or more polling points may be defined. These are locations along the journey at which customers might be asked questions relating to the journey. Thus for example if the customer journey comprises visits to a series of web pages, the locations may be web pages. In addition, one or more possible intervention points may be defined. These are locations at which an intervention in the journey may occur. Polling points may be coincident with intervention points or they may be sited at different locations. Both the polling points and the possible intervention points may be a subset of all possible interaction points. In other words not all of the interaction points in a customer journey are necessarily intervention points or polling points. Thus a computing system according to embodiments of the invention may receive input defining one or more polling points and/or one or more intervention points.

At the next operation 104 in FIG. 1, metrics of interest may be defined. These may include metrics that can be determined using attitudinal data such as data from customer polls, for example degree of satisfaction or perceived level of effort to reach that point in the journey, and metrics that can be determined from behavioral data, for example propensity to complain. This operation may also include the determination of a threshold for each metric, which may for example determine whether an intervention in the customer journey should be prompted. More than one threshold may be determined for a metric. For example different thresholds may be used for different groups of customers. The metrics and thresholds may be input, e.g. by an operator, and thus a computing system according to embodiments of the invention may receive input defining one or more metrics and one or more thresholds for each metric.

At the next operation 105 in FIG. 1, one or more polls may be designed to test one or more of the metrics defined at operation 104. Thus input data to a computing system for use in polling customers is received that might include the text for questions to be put to customers, ranges of possible scores, and other data as known in the art of designing polls.

At the next operation 106 in FIG. 1, one or more interventions may be designed for example a special offer to a customer with a high level of dissatisfaction. Input data for use in intervention in a customer journey is received that may determine the nature of the intervention, e.g. screen pop-up or special offer, text for help questions and so on. Operation 106 may include the design of different interventions for different customers or customer groups to be applied according to segmentation rules which may also be configured, for example, by user input.

The design of polls and interventions may be wholly or partially performed by an operator. At least part of these operations may be performed using one or more processors, for example using configurable templates.

Figure 2:
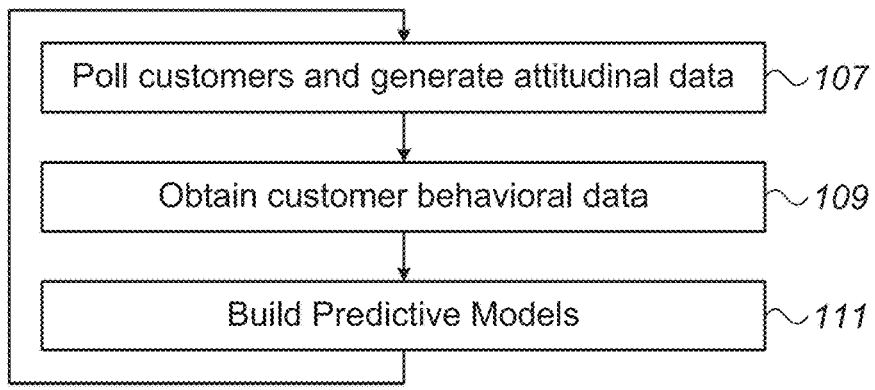
FIG. 2 is a flow chart showing operations that may be performed following configuration of a method or system according embodiments of the invention, in order to build and improve predictive models.
Figure 3:
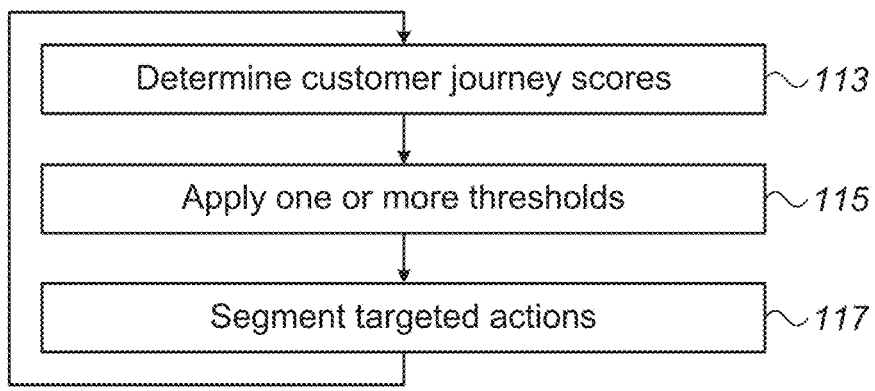
FIG. 3 is a flow chart showing operations including determination of customer journey score that may be performed following configuration of a method or system according embodiments of the invention.

Following configuration a system may be ready for polling a selection of customers and intervening in their journeys, for example according to the flows shown in FIGS. 2 and 3.

Figure 4:
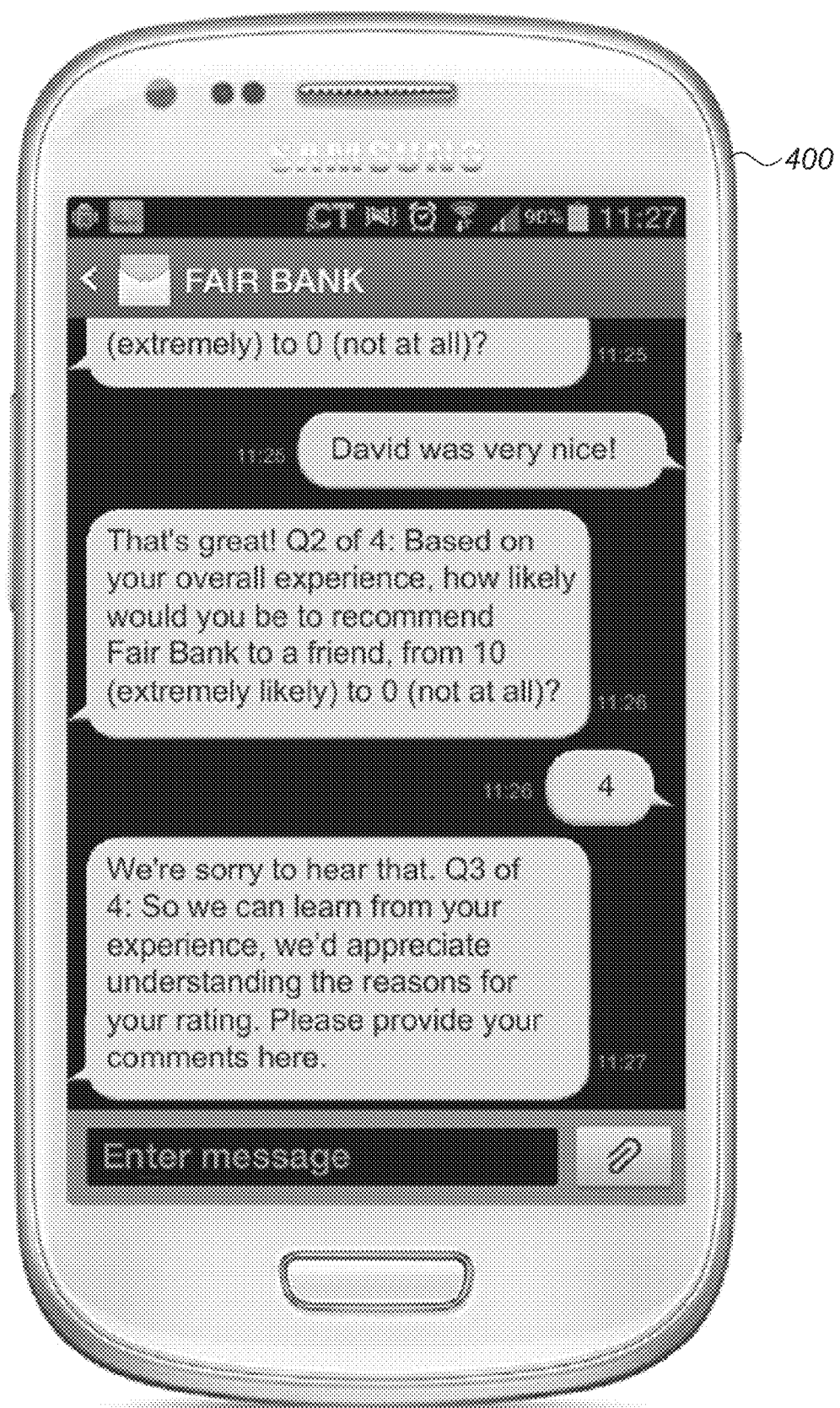
FIG. 4 illustrates an example of customer polling by text message according to embodiments of the invention.
Figure 5:
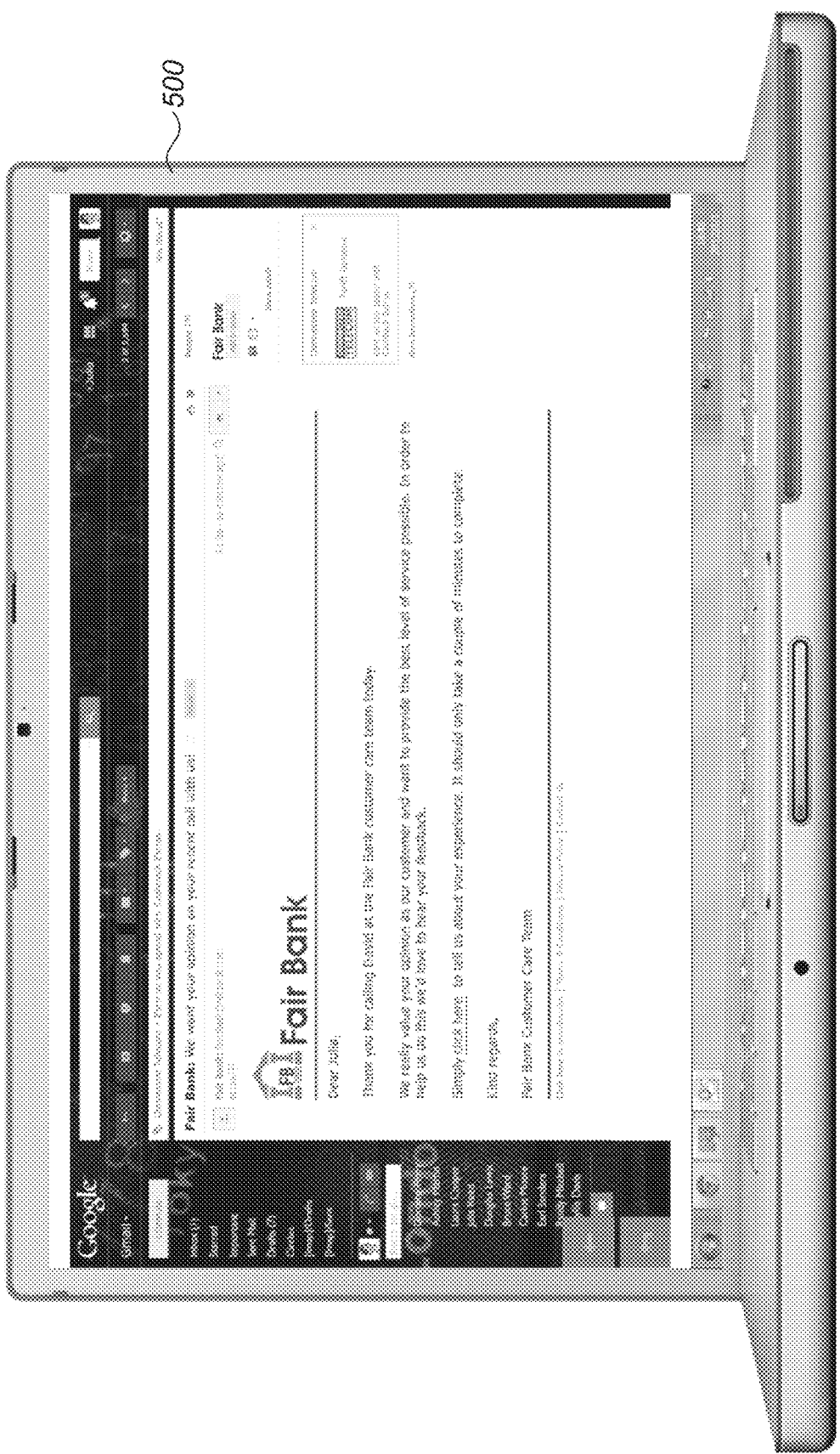
FIG. 5 illustrates an example of customer polling by email according to embodiments of the invention.

Referring now to FIG. 2, at operation 107, a sample of customers in the one or more defined journeys is polled at one or more points in the journey to generate attitudinal data for the polled customers. Polling may be done in various ways using one or more channels including but not limited to email, text and telephone call. The results of polling may provide attitudinal data such as satisfaction level or degree of effort perceived by the polled customer. Polling may include one or more questions and may be automatic. An example of polling by text message is illustrated in FIG. 4 which shows a series of questions and answers presented on the screen of a smart phone 400. An example of polling via email is shown in FIG. 5 in which a customer is invited to take part in an online survey, in this example presented on a computer screen 500.

The question or questions asked in a poll may relate to a metric of interest. The question or questions may require a numerical value in response or a response that can be represented as a numerical value. For example "Yes" and "no" can be represented in binary form and a range of descriptors from "excellent" to "very poor" may be represented on a scale of 1 to 10.

A predetermined percentage of customers, for example between 1% and 10%, may be polled when they pass particular predefined points in the journey. According to some embodiments of the invention it is ensured that the polling is random, for example to ensure a representative sample and/or to avoid over-polling customers. To ensure a representative sample a die may be thrown according to any known algorithm each time a customer arrives at a polling point to determine whether the customer should be polled. Depending on the "fall" of the die the customer may receive a survey question or questionnaire. To avoid over-polling, rules may be applied for example to avoid polling customers who have recently received another feedback request, or have visited several polling points within a short period of time, for example.

The next operation 109 in FIG. 2 is the obtaining of customer behavioral and/or other descriptive data. This may be achieved in various ways. For example this data may have been previously acquired based on previous interactions with customers and stored in a store such as customer data store 702 shown in FIGS. 7 and 11, or it may be obtained in real time in operations running in parallel to the polling of customers. Behavioral data may include website page view data, call center data such as number of calls, results of speech analytics and a wide range of other recordable data relating to customer behavior. This may also be retrieved from a store such as customer data store 702. Operation 109 may comprise obtaining all or a subset of the data stored in the customer data store. For example only the most recent data, defined by a time period such as last 24 hours, may be retrieved.

Operation 111 in FIG. 2 is the building of a set of predictive models that may be used to determine customer journey scores. An example of a customer journey score is a real-time prediction of a metric used during the polling operation 107, such as customer satisfaction or the propensity of the customer to complain, or perceived level of effort. A predictive model may use the metric as a dependent variable and other data, such as data pertaining to the particular customer as independent variables. According to some embodiments of the invention, the prediction of a metric, in other words determining customer journey score, may be based on a combination of attitudinal and behavioral data pertaining to the customer.

Thus according to embodiments of the invention, using behavioral data, for example from historical customer journeys, together with the poll results, models predicting a metric may be built and/or updated. According to embodiments of the invention models, for example mathematical models, can be used to determine a customer journey score for any customer. In the case of a model using polling data, a model based on the polling data can be used to determine a customer journey score for any customer in the vicinity of the polling point. The vicinity may be determined in various ways, for example number of web page "hops" from the one on which a survey was presented.

Using models, a customer journey score may be determined for customers for whom there is no attitudinal data. The models may be used according to some embodiments of the invention to extrapolate obtained poll results to the remainder of the population who were not polled.

Some models may not require any customer-specific data at the time of initial building, in which case the building of the model or models may take place before the polling of customers and obtaining of customer data at operations 107 and 109. Whether or not such data is used in the initial creation of a model, after either of operations 107 or 109 any of customer attitudinal data, behavioral data and descriptive data may be used to update a previously created model. Thus according to some embodiments of the invention one or models may be taught according to experience using known techniques of machine learning in order to improve the accuracy of prediction. This is illustrated in FIG. 2 where the flow returns from operation 111 to operation 107. The operations of FIG. 2 may be part of a continuous loop and may be performed in any order.

FIG. 3 is a high level flow diagram showing operations which may be performed during a customer journey, according to an illustrative embodiment of the invention. Each box in FIG. 3 may indicate a single operation or a set of operations. A more detailed flow that may be implemented according to some embodiments of the invention is described with reference to FIG. 10. At operation 113, during journeys made by customers, customer journey scores are determined, each using a model from the set of predictive models built at operation 111. Thus according to some embodiments of the invention, at each pre-defined interaction point for a set of customers at which an intervention may take place, the predictive models are used to determine a customer journey score in real-time. Each customer journey score produces an estimate, or prediction, of a dependent variable, the metric, for an individual. For example, if the model was a linear regression model it could be represented by the equation:

$$\text{prediction} = c_1 x_1 + c_2 x_2 + \ldots + c_n x_n \quad (1)$$

where $c_1, c_2 \ldots c_n$ are coefficients and $x_1, x_2 \ldots x_n$ are independent variables including descriptive variables such as age and height and behavioral variables such as frequency and times of visits. In some embodiments, the model can be a weighted sum. In some embodiments, the model is a combination of scores derived using different modeling techniques as is known in the art.

Thus according to some embodiments of the invention there may be available at all times a customer journey score for each of a set of customers, updated at their last interaction. Then a system according to the invention can retrieve or determine a current customer journey score for the customer at any time and use the score to determine whether an intervention in the customer journey should take place.

The next operation 115 shown in FIG. 3 is the application of one or more thresholds to determine whether an intervention should be prompted. According to some embodiments of the invention, whenever the customer journey score for a particular customer for a particular metric crosses a threshold an action is triggered, such as the prompting of an intervention. This prompting may be as simple as flagging a user id, for example along with a summary of their journey so far, to a human operator, so that the human operator can intervene. The intervention may take the form of a pop-up help window in the web channel. The intervention could be in the form of an email containing a personalized discount or offer. More generally trends in customer journey scores may be monitored and used to trigger other actions such as changing the journey itself, for example by optimization of web content or redesign of a website map.

The next operation 117 shown in FIG. 3 is the segmentation of targeted actions, which may take place if an intervention is to be prompted as described in more detail with reference to FIG. 10. According to some embodiments of the invention, different actions may be targeted at different customer segments or sets of customers. This may be determined by a set of configurable rules that may contain the logic of any differentiated action by segment. For example, high value customers may receive a call whereas other customer may only receive an invitation to chat during a web session. The operations of FIG. 3 are part of a continuous loop for any particular customer undergoing a journey.

A customer journey score model of the kind built at operation 111 may consist of some function of a set of input or independent variables. Equation 1 is one example of a model. There are many other modeling techniques that are well known in the art and may be used in some embodiments of the invention including but not limited to linear regression, logistic regression, decision tree, random forest, neural network, support vector machine and Bayesian network. The independent variables may characterize the customer or aspects of the journey, or may be any other factors that may affect the customer's experience or attitude. Any number of variables may be taken into account in determining a customer journey score. Examples of variables include but are not limited to:

Number of channels visited over a specific period of time
Number of web pages visited, or some other definition or indication of the customer's previous activity (which might indicate that the customer needs help)
Average time spent per web session
Cost of contract for mobile phone customer
Number of previous calls to call center
(For a call center) Details on current call (such as call length, number of transfers, number/length of silences)
Number of store visits, waiting times, traffic volumes, distance from store, store format, etc.
Feedback scores and interaction sentiment data (where available) Customer attributes: demographics, products, value segment, etc.
Etc.

Thus the customer journey score may be based on customer subjective or attitudinal data, such as the results of survey or polls, customer behavioral data relating to customer activities (objective data), customer descriptive data (objective data) such as age, height, hair color, or any combination of these kinds of data. According to some embodiments of the invention, customer journey scores, which may be used in customer journey management such as intervention or modification, may be based on a combination of at least subjective data and behavioral data.

It will be appreciated from the foregoing that according to some embodiments of the invention the value for the customer journey score will depend on where the customer is in the journey.

A specific example of the use of customer journey scoring according to some embodiments of the invention for intervention in a web session will now be described.

FIGS. 6A and 6B are schematic diagrams showing basic components of two alternative systems according to embodiments of the invention which may use customer journey scoring for intervention in a web session. Any of these components comprise a computing device including one or more processors, for example they may include the computing system, or variations or parts of the computing system, shown in FIG. 13.

Each of the systems shown in FIGS. 6A and 6B comprises a customer journey score "CJS" server 601, a website host server 602 and a customer device 603 which may comprise for example a personal computer, for example implementing a browser application. The browser application is able to communicate with the CJS server 601 via the website host server 602.

It should be noted that the servers 601 and 602 need not be physically separate or self-contained components. They could be virtual servers or services on shared servers. The components of the systems shown in FIGS. 6A and 6B may communicate with each other in any way including wired and wireless connections over one or more local, wide area or global networks. A user of the system such as the owner of the website on which the web session is operating may have access to the website host server 602, for example remote access via a user device such as a personal computer, and may use this to perform tasks such as updating of information on a website. In other embodiments of the invention, the website host server 602 may be replaced by a call center server. In the case of a call center, the customer device may be equipment used by the call center agent who records the response of the customer during a telephone call. It should also be noted that a customer journey server such as server 601 may serve multiple web host servers or call center servers or both, and therefore a system according to some embodiments of the invention may include one or more CJS servers each serving one or more other servers. Also, according to some embodiments of the invention, the functions of any two or more of the system components shown in FIGS. 6A and 6B may be combined into one computing device or spread across more computing devices according to specific system requirements.

Either of the systems shown in FIGS. 6A and 6B may be configured with operating parameters for a particular customer journey which may include any of the following:

One or more locations to be used as polling points. Whenever a customer visits one of these polling points a die is thrown and depending on the fall of the die they may receive a survey question.

One or more locations to be used as possible intervention points. These may be coincident with the polling points or in other places. Locations can also refer to an external means of intervention with a customer such as an email targeting system.

One or more messages to be displayed to the customer for each possible intervention point.

A Customer Journey Score threshold, for customers with scores below which no action would be taken.

A set of segment targeting rules, directing particular actions at particular segments.

According to some embodiments of the invention, the intervention and polling locations may be provided to the website host server 602, for example as part of the configuration of the website. According to some embodiments, the remaining parameters may be provided to and implemented by the CJS server 601.

CJS servers such as server 601 may be configured by, and under the control of, the party interacting with the customer such as the company owning the website. In the illustrated systems, for a customer to interact with the system, the application at the location where the content is displayed, e.g. the customer device 603, must be able to communicate with the CJS server, 601.

The customer will be able to interact with the system typically at several different points during a customer journey for example between initial landing on a website and making a purchase. Some of these points are designated as polling points and possible intervention points for example in the configuration of the website. In the website example, the customer will view a series of web pages and, unbeknown to him/her, the progress of his/her session will be logged to the CJS server. For example each webpage could be tagged so that every time it was loaded, e.g. rendered on the customer's screen, a request or notification would be sent to the CJS server. If the end-customer visits a polling page, a request will be sent from that page to the CJS server requesting a survey. If the customer is selected by the polling logic to receive a survey then it might be sent directly to the page or it might be sent via some other channel, such as email or SMS. If the end-customer responds to the survey the results will be logged in the CJS server.

The customer may then continue visiting other pages on the website. If they visit an interaction point then a request is sent to the CJS server requesting an action. The CJS server will determine if any of the actions available to it should be taken depending on the current customer journey score. This may be a pop-up offer to chat with an agent, an email offer or any other action available to the system.

In brief, users may have various actions displayed to them as they interact with some third party application. These actions may be an invitation to chat through a pop-up, an email message or any other interaction.

Referring to FIG. 6A, possible information flows between the system components according to some embodiments of the invention may be as follows:

611—a browser application running or executing on the customer device 603 requests a page from the website host server 602

612—if the customer is at one of the polling or possible intervention locations, the website host server 602 sends a notification to the CJS server 601

613—the response of the CJS server 601 will depend on whether the location or point in the customer journey is a polling location or an intervention location.

If the location is an intervention location, the CJS server 601 will determine a customer journey score for that location and if it is above a predetermined threshold, an intervention will be prompted. This may be done by the CJS server 601 sending to the website host server 602 information enabling the website host server to perform the intervention, such as content for the intervention or the location of content for the intervention. For example, the CJS server 601 may respond to the website host server 602 with a URL identifying a web page containing an offer or the CJS may send a pop-up to be displayed to the customer. According to some embodiments of the invention, only one model is used to predict one metric. According to other embodiments of the invention more than one metric may be predicted, for example using a respective model for each metric. In that case the CJS server 601 may determine a customer journey score for each metric and prompt an intervention if any of them are above their predetermined threshold.

If the location is a polling location, a die may be cast on the CJS server 601 to select randomly a small sample of the customers at that location, e.g. landing on that web page, and the CJS server 601 may respond to the website host server 602 with a URL identifying a web page containing a survey or poll or may send the survey or poll as a pop-up to be displayed to the customer.

614—the intervention, if the threshold is exceeded, or the survey or poll is returned by the website host server 602 to the browser on the customer device 603.

Referring to FIG. 6B, possible information flows between the system components according to some embodiments of the invention may be as follows:

621—a browser operating on customer device 603 requests a page from the website host server 602

622—the website host server 602 returns the page to the browser and if the page is at a polling or intervention location, an embedded tag is included

623—when the page renders at the customer device 603, the tag sends a request to the CJS server 601 for an intervention or survey

624—the CJS server 601 responds to the customer device in a similar manner to flow 613 in FIG. 6A.

FIG. 7 shows a possible high level architecture suitable for a CJS server 601 as shown in either of FIGS. 6A or 6B according to some embodiments of the invention. The illustrated architecture is shown to include a data platform 701 with data storage including a customer data store 702, model repository 705, poll repository 704 and action repository 703. The customer data store 702 may be the source of behavioral customer data the system will use to build predictive models. The customer data store 702 may also store other objective data relating to customers including descriptive data such as age, income, place of residence etc. The architecture also includes a polling server 710 which may be used to handle the sending of surveys and storage of the responses, for example using one or more of operations 107, 109, 111. Although shown as a separate block in FIG. 7, the polling server 710 may reside on the data platform 701. The architecture further comprises an intervention server 715 which may implement one or more of operations 113, 115 and 117. End customers, indicated at 720, may interact with the data platform via the intervention server 715 or the polling server 710, for example via a website host server as shown in FIG. 6A. The architecture shown in FIG. 7 also includes a model builder 722 connected to the data platform 701.

In operation a CJS server or system according to embodiments of the invention may listen for poll and intervention requests, for example as described with reference to FIGS. 6A and 6B. These requests may be received through a well specified application programming interface "API".

Figure 8:
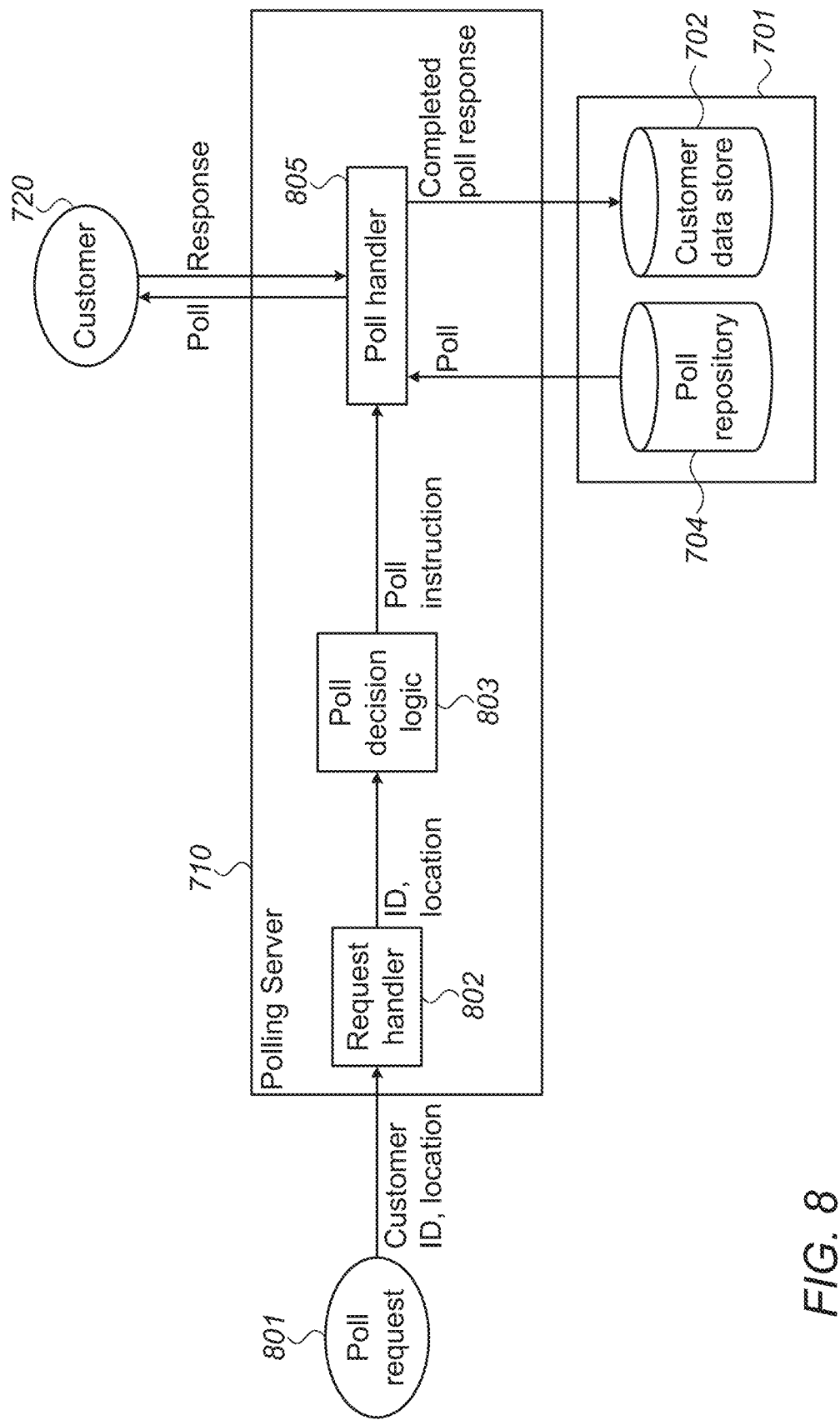
FIG. 8 shows an example high level architecture for a polling server according to some embodiments of the invention.

An example of the handling of poll requests is illustrated in more detail schematically in FIG. 8. As shown, the Polling Server 710 includes a poll request handler 802 and poll decision logic 803 and receives poll requests 801. The poll requests 801, for example in flow 612 or 623, may be triggered at certain locations or points during a customer journey, for example as defined at operation 103 in FIG. 1, for example at the end of a call center call or the conclusion of an online purchase. A request 801 may be sent to the CJS server 601. For the illustrated architecture, the request will contain a customer identifier and a location, i.e. the identifier of the polling point that triggered the request, referred to herein as "location" but also sometimes known in the art as "context". The request is received by the poll request handler 802 in the Polling Server 710 which forwards the request to the poll decision logic 803. The poll request handler 802 may do nothing more than listen for requests and forward them to the poll decision logic. It may perform additional operations on requests such as checking that they are legitimate. The poll decision logic 803 determines whether a poll will be sent and, if so, which particular poll. Thus for example the poll decision logic may operate to select only a small random sample of customers to be polled from those for which a poll request is received. According to other embodiments of the invention this sampling may have been done before the poll request is received. If it is decided that the identified customer should be polled, a poll instruction is passed from the poll decision logic to the poll handler 805. The poll handler 805 may operate to retrieve the appropriate poll from the poll repository 704 and send it to the customer indicated at 720, optionally via the website host server 602 by one of several channels. Polling may be by text message (or a succession of messages), an email, a pop-up on a web browser or via any other channel. At some later time the customer may respond and the response forwarded by the poll handler 805 to be logged in the customer data store 702.

Figure 9:
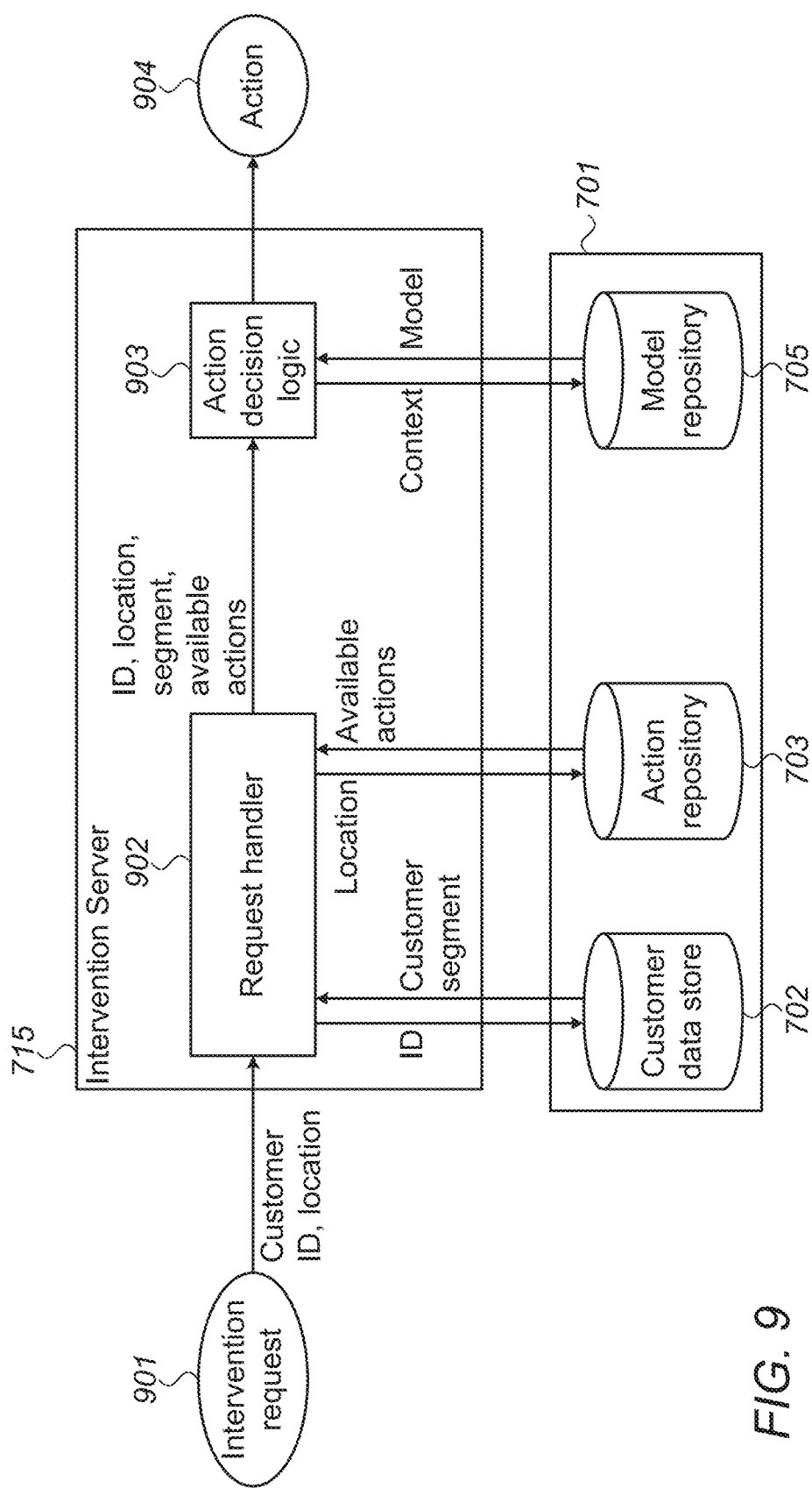
FIG. 9 shows an example high level architecture for an intervention server according to some embodiments of the invention.

The handling of intervention requests is illustrated schematically in FIG. 9. As shown in FIG. 9, the intervention server 715 includes an intervention request handler 902 which may be integrated with or separate from poll request handler 802, and action decision logic 903. Intervention requests 901, sent for example in flow 612 or 623, may be triggered at certain locations or points during a customer journey, for example as defined at operation 103 in FIG. 1, as with poll requests. They may be triggered at different locations to the polling locations and may for example be at points where assistance can easily be offered, for example, if the defined journey is a sales funnel, an intervention location may be towards the end of a sales funnel where the risk of basket abandonment is high. An intervention request from a customer device 603 is sent to the CJS server 601. As with a poll request this may include the customer location, and a customer identifier. The request 901 is received by the request handler 902 at the intervention server 715. The request handler 902 may first retrieve segment information, if present, using the data stored at the customer data store 702 for this particular customer. The request handler 902 then retrieves available actions for the location, possibly restricted by segmentation rules applicable to the customer, from the action repository 703.

The available actions and the segment if not already applied are passed to the action decision 903 logic which determines what action, if any, to return to the customer. An action instruction 904 may be output from the action decision logic if it is decided that some action should be taken, such as prompting an intervention. A prompt for an intervention may include further information depending on what form the intervention is to take. For example as described with reference to FIGS. 6A and 6B it may include content to be presented to a customer or the identity of a location from where the content can be retrieved.

Systems and methods according to embodiments of the invention may be used to provide information on the performance of channels in which customer journeys take place. For example if interventions are prompted more frequently at one intervention point than at another, this may be an indication that the customer journey could be modified to improve performance, measured for example by sales volume, click through rate or other well-known performance metric.

Figure 10:
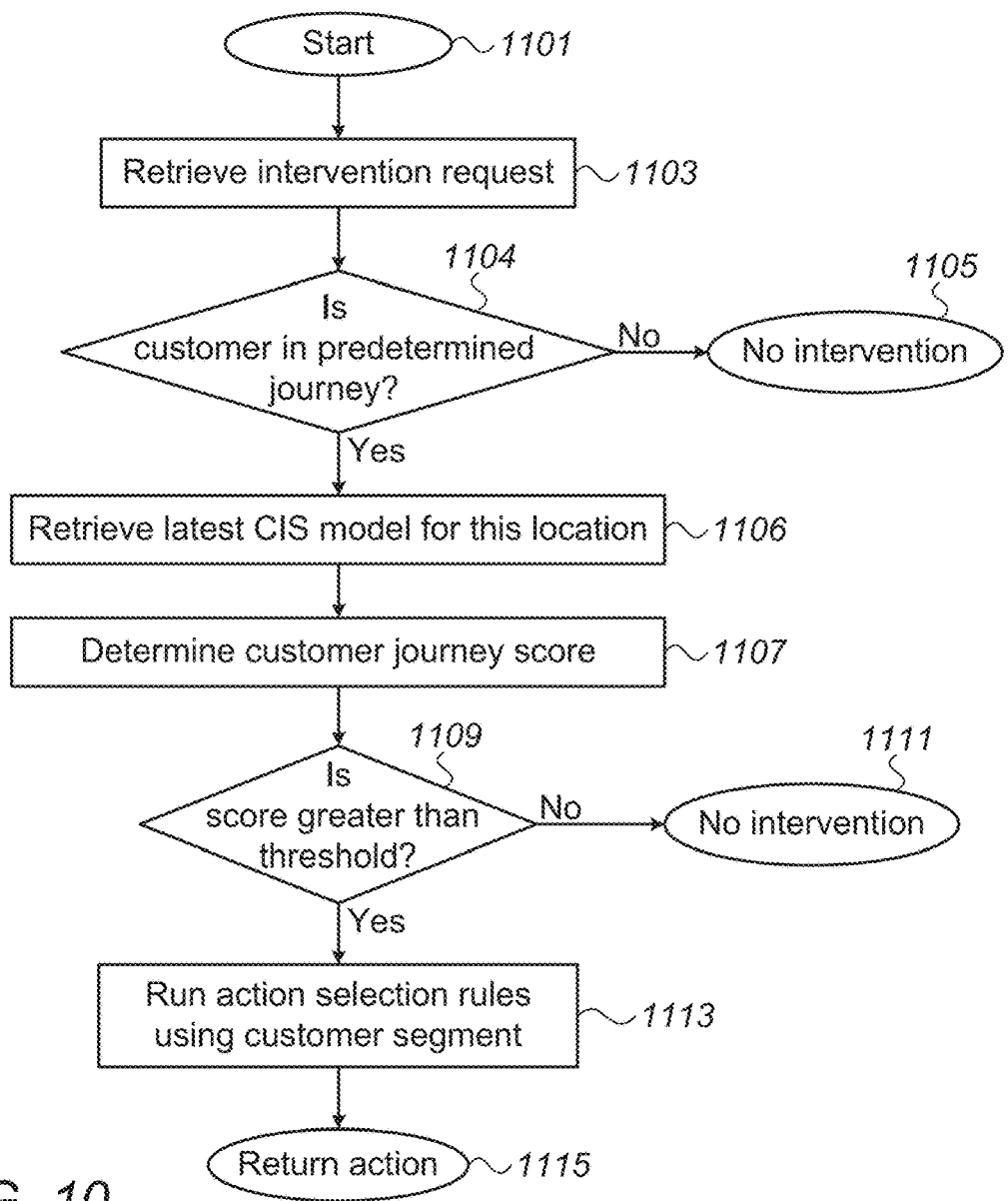
FIG. 10 is a flow chart showing the use of customer journey scoring to decide whether to prompt an intervention according to embodiments of the invention.

FIG. 10 is a flow chart showing an example of how action decision logic 903 may operate to determine whether an intervention in a customer journey should be prompted.

The flow of FIG. 10 begins with initialization at operation 1101, following which an intervention request 901 is received at operation 1103 at an interaction point that has been determined to be a possible intervention point. At operation 1104 a determination is made as to whether the customer is undergoing a journey of interest, for example according to criteria used to define the customer journey at operation 101. If the customer is not undergoing a journey of interest, the logic returns a no intervention decision at operation 1105 and the flow reverts to waiting for another intervention request. If the customer is undergoing a journey of interest, then at operation 1106 the appropriate current customer journey score model, e.g. the current version of equation (1), is retrieved for the customer identified in the intervention request.

According to some embodiments of the invention, the models may be generic and applicable to any customer location. For example, such models may include a variable relating to location so that the same model can be used at all locations. According to other embodiments of the invention, different models may be used for different locations in which case the appropriate model for that location will be retrieved at operation 1106. The use of different models for different locations may be useful in determining that a particular location, e.g. webpage, causes problems for individuals. A model for a particular location may be built by filtering the polled customers that have visited the location and using only data related to those customers in the building of the model. If survey scores or poll results are filtered by location, it can be inferred that those scores are relevant to that location. At operation 1107 a customer journey score is determined for the customer. In one example, this may be done by scoring the customer profile against the customer journey score model to predict a survey score, e.g. what score that customer, who may not have been surveyed, would have given if surveyed. According to some embodiments of the invention the customer journey score depends on one or more variables relating to the customer. Thus the determination of customer journey score may include the retrieval of customer data from the customer data store 702 for use in the determination of customer journey score. The survey score is a simple example of customer journey score and may for example indicate a metric such as satisfaction level. According to some embodiments of the invention, rather than simply indicating a predicted survey score, the customer journey score may take account of other variables, perhaps not available from survey data, to attempt to provide a more realistic indication of customer satisfaction level.

Following the determination of customer journey score in operation 1107, the score is compared to a threshold at operation 1109. If, at this point in the journey, the score is not above the threshold, the logic returns a no intervention decision at operation 1111 and the flow recommences next time an intervention request is received.

If the customer journey score exceeds the threshold, then at operation 1113 intervention action selection rules are applied to determine what kind of intervention should take place. The action selection rules may use segment information to determine the most appropriate action for that user. For example, high net worth customers may be treated differently than other customers. For example a segment rules may be:

if segment=high_net_worth then select action_1
else select action_2 where, action_1 may be to schedule a personal call with an agent and action_2 may be to display a chat pop-up on the customer's screen.

An action is selected and returned at operation 1115, for example from action decision logic 903, for example to a calling application operating at the website host server 602.

The flow of FIG. 10 may be repeated at subsequent locations that have been determined to be possible intervention points at operation 103 in FIG. 1.

Figure 11:
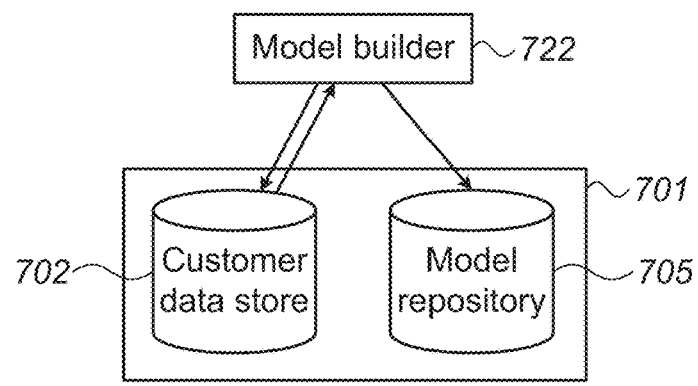
FIG. 11 is a schematic diagram illustrating a model building architecture for use in the creation of models.

FIG. 11 is a schematic diagram illustrating model building architecture for use in the creation of models. The action decision logic 903 uses models from the model repository 705. These may include models that estimate the customer's survey score, if they were surveyed at the current moment. Models to predict survey score may be rebuilt regularly, for example nightly. In a possible embodiment of a system according to the invention, a model builder 722 at the intervention server 715 requests customer data from the customer data store 702, and the requested data is returned to the model builder 722. The model builder 722 builds or updates stored models using the latest data and any updated or new models are then stored in the model repository 705, for example with updated models replacing previous versions. The customer data store may store customer data including values of variables for each customer, e.g. age, past browsing history and many other things, at the time of polling along with their poll response (e.g. survey score). This data will only be available for the subset of customers surveyed. This data may be used to build a model. Equation (1) is one example of a model.

Figure 12:
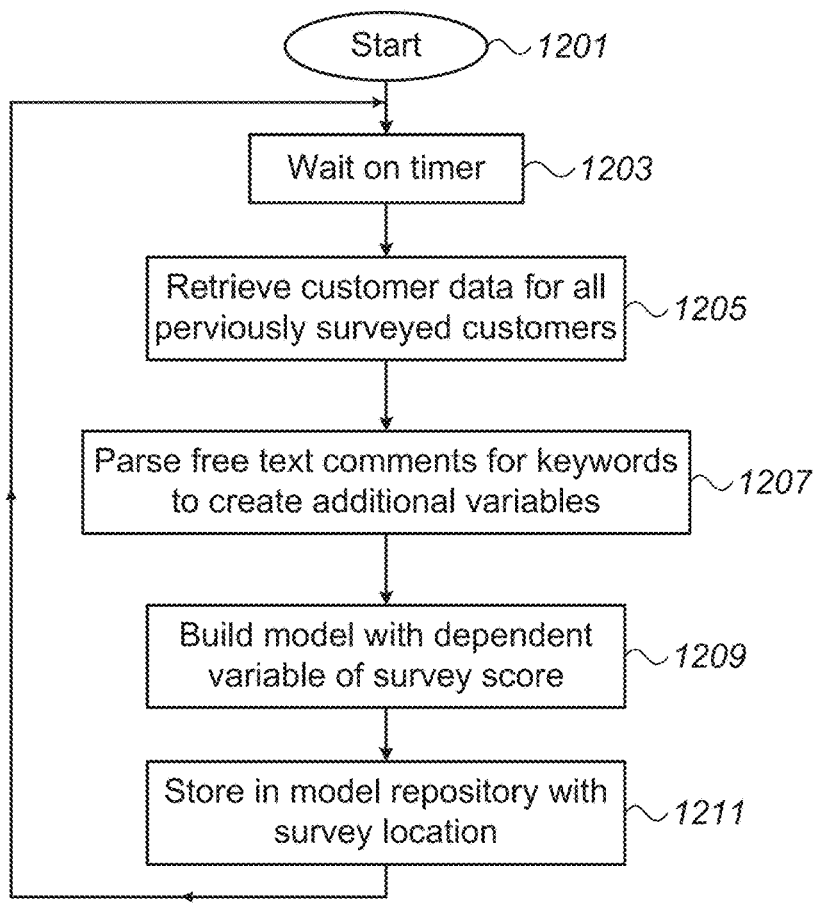
FIG. 12 is a flow chart showing example operations performed as part of a model building process according to embodiments of the invention.

FIG. 12 is a flow chart showing an example of how models may be built, or created, for determining customer journey scores. The operations of FIG. 12 may be performed in model builder 722. These models may incorporate the latest behavioral and survey data. The example shown in FIG. 12 is for the prediction of survey score. Models for predicting other metrics may be built, e.g. created, in a similar way.

After initialization at operation 1201 the model builder may be in a waiting state at operation 1203 for sufficient data to have been accumulated. Then at operation 1205 customer data for all previously surveyed customers may be retrieved. Some of this may not require further processing. Other data such as voice conversation data or free text provided in an independent survey may be processed before being used in the creation of a model. Thus in operation 1207 this other data is parsed, for example to find one or more keywords. This and possibly other retrieved data may be used to create variables. These variables may be additional to variables already provided in a basic initial model. A model such as equation (1) is then created to determine a variable, in this example survey score. The created model is then stored at operation 1211 in the model repository 705. The model may be stored along with the survey location, e.g. polling point such as webpage or other location from which the request was sent, so that it is only used to predict survey score for the same or similar locations. A set of models for different locations may be created as data is accumulated. Additional sets of models may be created for different metrics. A model may be created automatically, for example using software operating on one or more processors. A default or initial model may use every variable for which a value is stored in the customer database. The model builder may learn that one or more variables do not affect the customer journey score and cease to retrieve them in future determinations of customer journey score. According to some embodiments of the invention at least part of the initial creation of the predictive models involves user input, for example receiving an initial selection of independent variables to be used in the determination of the dependent variable.

FIG. 12 illustrates operations that may be performed in the initial building of models. Models may be updated in a similar process to that of FIG. 12. In a model updating process, it is possible that in operation 1205 only the most recent data, e.g. the last 24 hours, is retrieved and one or more models are modified, rather than built, in operation 1209.

Embodiments of the invention may use the following data structures:
1. Model Repository
    Map of locationID ->model
    This may store the latest build of each model so they can be retrieved by location ID.
2. Customer profile
    Set of independent variable values.
    The exact form may be model dependent. For example, for a logistic regression model the independent variables must be numeric quantities associated with each variable
    Set of dependent variable values
    These may be real values containing the survey responses returned by the customer. This could be a score between 1 and 5.
3. Action selection rules
    These may generally be a set of rules in the form:
    if (some condition) then select (some action)
    These rules could be represented in any rules language, such as ilog.
4. Action
    An action may generally be a fragment of xml containing an instruction for an external tool, either on the customer's browser or some other device. For example, the xml could contain a URL pointing to some content to be rendered on the customer's screen. Alternatively, it could contain an instruction for a third party email tool to schedule a customer email.

Figure 13:
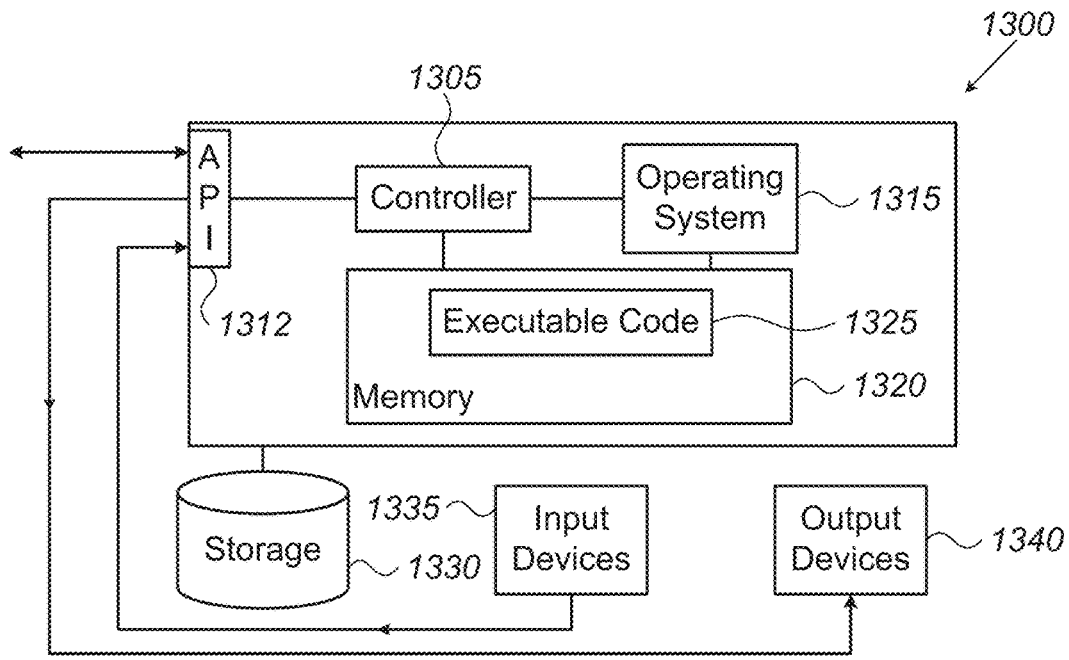
FIG. 13 is a high level block diagram of an exemplary computing system according to some embodiments of the present invention.

Reference is made to FIG. 13 showing a high level block diagram of an exemplary computing system 1300 according to some embodiments of the present invention, for example for use in systems according to embodiments of the invention. For example, CJS server 601 or other computing devices carrying out all or part of some embodiments of the present invention may include components such as those included in computing system 1300. Computing system 1300 may comprise a single computing device or components, and functions of system 1300 may be distributed across multiple computing devices. Computing system 1300 may include one or more controllers such as controller 1305 that may be, for example, a central processing unit processor (CPU), a chip or any suitable processor or computing or computational device, an operating system 1315, a memory 1320, a storage 1330, input devices 1335 and output devices 1340. For example, server 601 may include one or more controllers similar to controller 1305, server 601 may include one or more memory units similar to memory 1320, and server 601 may include one or more executable code segments similar to executable code 1325. One or more processors in one or more controllers such as controller 1305 may be configured to carry out methods according to some embodiments of the invention. For example, controller 1305 or one or more processors within controller 1305 may be connected to memory 1320 storing software or instructions that, when executed by the one or more processors, cause the one or more processors to carry out a method according to some embodiments of the present invention. Controller 1305 or a central processing unit within controller 1305 may be configured, for example, using instructions stored in memory 1320, to perform the operations shown in either of FIG. 10 or 12. The platforms 701 and 715 of FIG. 7 may be implemented as executable code stored in memory 1320 to be executed by one or more processors, for example in controller 1305.

Operating system 1315 may be or may include any code segment designed and/or configured to perform tasks involving coordination, scheduling, arbitration, supervising, controlling or otherwise managing operation of computing system 1300, for example, scheduling execution of programs. Operating system 1315 may be a commercial operating system. Memory 1320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1320 is a non-transitory processor-readable storage medium that stores instructions and the instructions are executed by controller 1305. Memory 1320 may be or may include a plurality of, possibly different memory units.

Executable code 1325 may be any executable code, e.g., an application, a program, a process, task or script. Executable code 1325 may be executed by controller 1305 possibly under control of operating system 1315. Executable code 1325 may comprise code for selecting an offer to be served and calculating reward predictions according to some embodiments of the invention.

In some embodiments, more than one computing system 1300 may be used. For example, a plurality of computing devices that include components similar to those included in computing system 1300 may be connected to a network and used as a system.

Storage 1330 may be or may include one or more storage components, for example, a hard disk drive, a Compact Disk (CD) drive, a CD-Recordable (CD-R) drive, a universal serial bus (USB) device or other suitable removable and/or fixed storage unit. For example, memory 1320 may be a non-volatile memory having the storage capacity of storage 1330. Accordingly, although shown as a separate component, storage 1330 may be embedded or included in memory 1320. Storage 1330 or memory 1320 may serve the function of the model repository 705, poll repository 704, customer data store 702 and action repository 703 shown in FIG. 7.

Input to and output from a computing system according to some embodiments of the invention may be via an API, such as API 1312 shown in FIG. 13. The API 1312 shown in FIG. 13 operates under the control of the controller 1305 executing instructions stored in memory 1320. Input to and output from the system via the API may be via an input/output port. Input may comprise poll requests 801, for example from customer device 603 or website host server 602. Output may comprise a poll or action 904.

The CJS server 601 may include user input devices. Input devices 1335 may be or may include a mouse, a keyboard, a touch screen or pad or any suitable input device. It will be recognized that any suitable number of input devices may be operatively connected to computing system 1300 as shown by block 1335.

The CJS server 601 may include one or more output devices. Output devices 1340 may include one or more displays, speakers and/or any other suitable output devices. It will be recognized that any suitable number of output devices may be operatively connected to computing system 1300 as shown by block 1340. Any applicable input/output (I/O) devices may be connected to computing system 1300 as shown by blocks 1335 and 1340. For example, a wired or wireless network interface card (NIC), a modem, printer or a universal serial bus (USB) device or external hard drive may be included in input devices 1335 and/or output devices 1340.

Input devices 1335 and output devices 1340 are shown as providing input to the system 1300 via the API 1312 for the purpose of embodiments of the invention. For the performance of other functions carried out by system 1300, input devices 1335 and output devices 1340 may provide input to or receive output from other parts of the system 1300.

Alternatively, all output from the CJS server 601 may be to a remote device such as a user device in which case the output devices may be replaced by a data port.

Some embodiments of the invention may include a computer readable medium or an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, some embodiments of the invention may comprise a storage medium such as memory 1320, computer-executable instructions such as executable code 1325 and a controller such as controller 1305.

A system according to some embodiments of the invention may include components such as, but not limited to, a plurality of central processing units (CPU), e.g., similar to controller 1305, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of using a predictive model to manage customer journeys, the method comprising using one or more processors in a computer server:
   receiving data defining a plurality of customer journeys, each customer journey comprising a succession of logged events representing a historical trail of previous actions performed by a particular customer in a computing system, each event corresponding to an interaction at an interaction point between a customer device and a server or other device;
   at each of a plurality of interaction points of a particular customer in a customer journey:
      retrieving from computer data storage a combination of independent variables representing objective and survey data relating to the customer;
      using a predictive model to determine a dependent variable representing a customer journey score for the particular customer at the interaction point based on the combination of independent variables representing objective and survey data relating to the customer;
      determining if the dependent variable representing the customer journey score is above a threshold; and
      if the dependent variable representing the customer journey score is above the threshold, sending information to be displayed to the customer.

2. The method of claim 1, wherein the predictive model is built by executing a continuous loop in which each iteration of the continuous loop comprises:
   collecting survey data from a sample of customers; and
   using machine learning to build the predictive model based on the accumulated survey data.

3. The method of claim 2, wherein the predictive model is built using machine learning to learn that one or more of the independent variables in the predictive model do not affect the dependent variable and ceasing to retrieve the one or more of the independent variables in future uses of the predictive model to determine the dependent variable.

4. The method of claim 1, wherein the predictive model is built by storing, in computer data storage, data structures including one or more location identifiers for one or more predictive models, a set of values for a plurality of independent variables, a set of values for one or more dependent variables, suggested action rules for one or more interventions, and computer-executable instructions for performing the suggested action rules.

5. The method of claim 1, wherein if the dependent variable representing the customer journey score is above the threshold, comprising intervening in the customer journey to change the customer journey itself by sending the device information to modify web content.

6. The method of claim 1, wherein if the dependent variable representing the customer journey score is above the threshold, comprising intervening in the customer journey by sending information to be displayed in a pop-up window on the customer device.

7. The method of claim 1, wherein the information to be displayed to the customer is an email containing a personalized discount or offer.

8. The method of claim 1, wherein the survey data is collected from a sample of customers triggered at predetermined interaction points during the customers' journeys.

9. The method of claim 1, wherein the dependent variable is determined for the particular customer for whom there is no survey data by extrapolating obtained survey data to the particular customer who was not polled.

10. The method of claim 1, wherein the predictive model is defined at each of a plurality of interaction points based on one or more independent variables representing survey data obtained from customers within a number of journey points from the interaction point.

11. The method of claim 1 comprising, using said one or more processors, determining the dependent variable as a weighted sum of the combination of independent variables.

12. The method of claim 1 comprising, using said one or more processors:
retrieving from computer data storage descriptive data relating to the customer; and
using the predictive model to determine the dependent variable at each interaction point based on a combination of independent variables representing objective, survey and descriptive data.

13. The method of claim 1, wherein the dependent variable representing the customer journey score is an estimate of customer satisfaction.

14. The method of claim 1, wherein the customer journey comprises interactions occurring over multiple communication channels.

15. The method of claim 1, wherein the survey data is obtained by polling a random sampling of customers at an interaction point along the journey.

16. The method of claim 1, wherein said determining if the dependent variable representing the customer journey score is above a threshold is triggered by an interaction at a predetermined interaction point by the particular customer in the customer journey.

17. The method of claim 1 comprising, using said one or more processors, retrieving the predictive model from among a set of multiple predictive models for determining multiple respective dependent variables, each of the multiple respective dependent variables being a measure of a different customer journey score.

18. The method of claim 17 comprising, using said one or more processors, selecting the predictive model associated with a particular location of the interaction point in the customer journey.

19. The method of claim 18, wherein the predictive model associated with the particular location is built by filtering customers from the plurality of customers that have visited the particular location and using only data representing previous actions performed by the filtered customers.

20. A system for using a predictive model to manage customer journeys, the system comprising:
a computer server comprising one or more processors configured to:
receive data defining a plurality of customer journeys, each customer journey comprising a succession of logged events representing a historical trail of previous actions performed by a particular customer in a computing system, each event corresponding to an interaction at an interaction point between a customer device and a server or other device,
at each of a plurality of interaction points of a particular customer in a customer journey:
retrieve from computer data storage a combination of independent variables representing objective and survey data relating to the customer,
use a predictive model to determine a dependent variable representing a customer journey score for the particular customer at the interaction point based on the combination of independent variables representing objective and survey data relating to the customer,
determine if the dependent variable representing the customer journey score is above a threshold, and
if the dependent variable representing the customer journey score is above a threshold, send information to be displayed to the customer.

21. The system of claim 20, wherein the predictive model is built by executing a continuous loop in which each iteration of the continuous loop comprises:
collect survey data from a sample of customers, and
use machine learning to build the predictive model based on the accumulated survey data.

22. The system of claim 21, wherein the predictive model is built using machine learning to learn that one or more of the independent variables in the predictive model do not affect the dependent variable and cease to retrieve the one or more of the independent variables in future uses of the predictive model to determine the dependent variable.

23. The system of claim 20 comprising computer data storage configured to store data structures including one or more location identifiers for one or more predictive models, a set of values for a plurality of independent variables, a set of values for one or more dependent variables, suggested action rules for one or more interventions, and computer-executable instructions for performing the suggested action rules.

24. The system of claim 20, wherein if the dependent variable representing the customer journey score is above the threshold, changing the customer journey itself by sending the device information to modify web content.

25. The system of claim 20, wherein the information to be displayed to the customer is an email containing a personalized discount or offer.

26. The system of claim 20, wherein the one or more processors are configured to:
retrieve from computer data storage descriptive data relating to the customer, and
use the predictive model to determine the dependent variable at each interaction point based on a combination of independent variables representing objective, survey and descriptive data.

27. The system of claim 20, wherein the one or more processors are configured to retrieve the predictive model from among a set of multiple predictive models for determining multiple respective dependent variables, each of the multiple respective dependent variables being a measure of a different customer journey score.

* * * * *